April 9, 1946.  H. SICULAR  2,398,195
FLUOROSCOPIC DETECTION APPARATUS
Filed Nov. 6, 1943  2 Sheets-Sheet 1
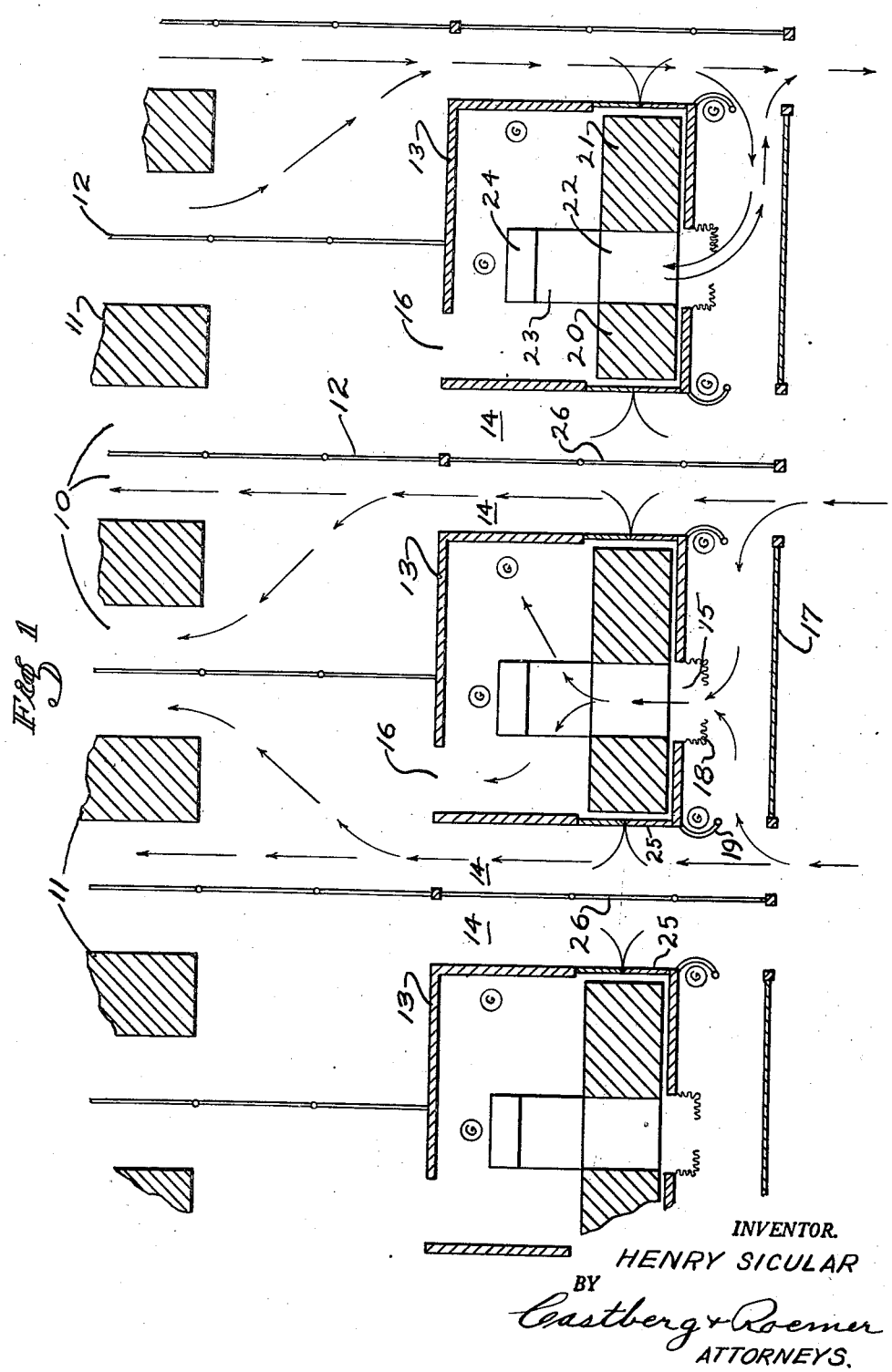
INVENTOR.
HENRY SICULAR
BY
Castberg & Roemer
ATTORNEYS.

April 9, 1946.                    H. SICULAR                    2,398,195
                    FLUOROSCOPIC DETECTION APPARATUS
                        Filed Nov. 6, 1943          2 Sheets-Sheet 2
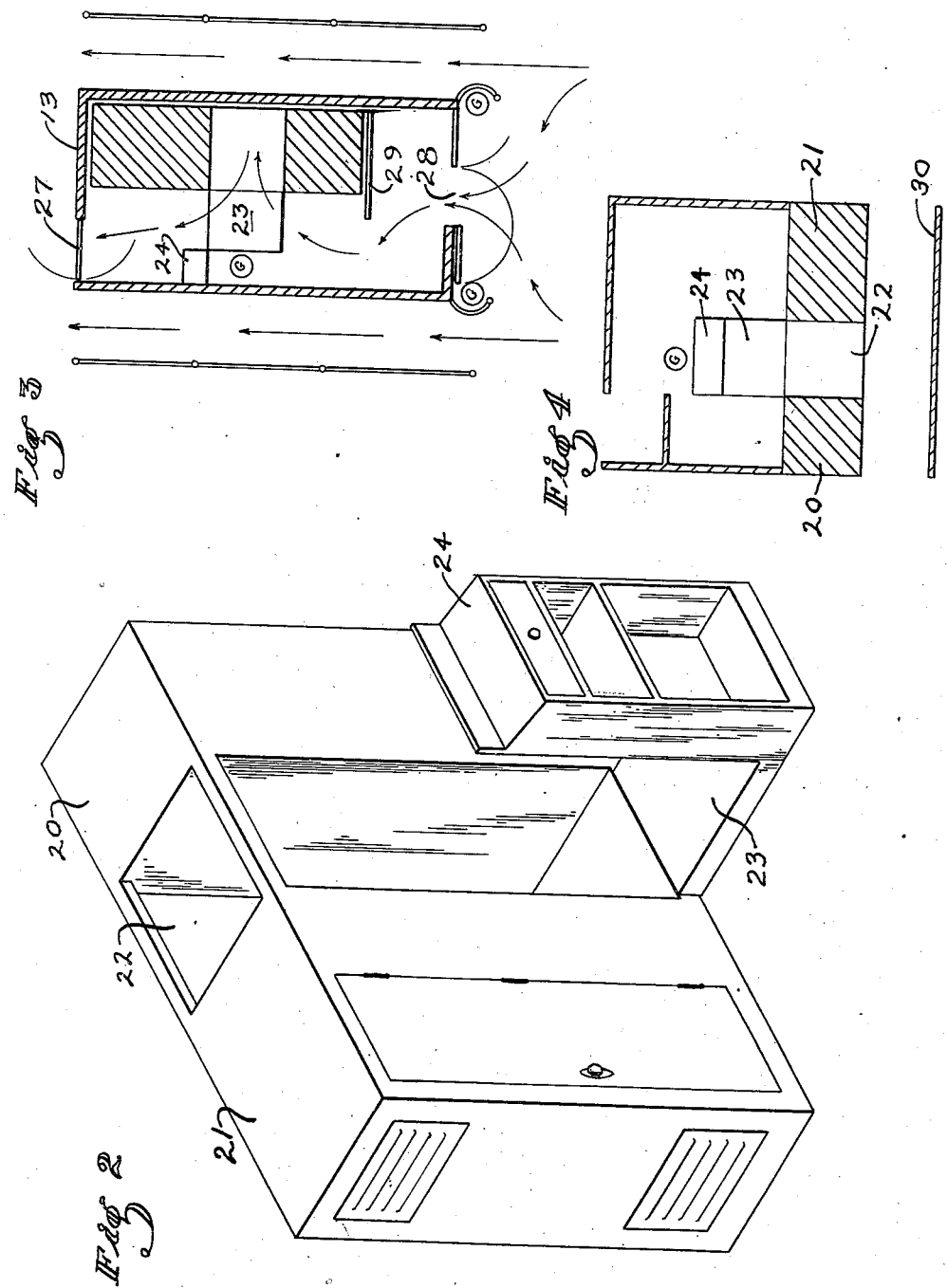

Patented Apr. 9, 1946

2,398,195

UNITED STATES PATENT OFFICE 2,398,195

FLUOROSCOPIC DETECTION APPARATUS

Henry Sicular, San Francisco, Calif.

Application November 6, 1943, Serial No. 509,319

1 Claim. (Cl. 20—0.5)

This invention pertains to the inspection or examination of the personnel entering or leaving an industrial plant or the like with the purpose of detecting stolen or forbidden articles on the persons inspected.

In my co-pending application for United States Letters Patent for Fluoroscopic detecting device, Serial No. 438,696, filed April 13, 1942, there is disclosed a device comprising an X-ray radiating unit and fluoroscopic screen upon which the image of a person in the field of radiation is projected, and an observer's station from which the screen may be viewed. One of the purposes of the device disclosed in said application is to permit the examination or inspection of persons entering or leaving such protected areas as large industrial plants or military reservations, with the object of detecting attempts to carry forbidden or unauthorized articles to and away from the plant. With the aid of this device a satisfactory inspection may be made within as short a time as two or three seconds. It is customary to use the device for the inspection of employees leaving work in plants employing many thousands of people. In most cases, the almost simultaneous exit of a large crowd of employees through a restricted gate area constitutes a rather serious traffic problem in itself so that detaining each person for even a second or two would cause undesirable congestion and an aggregate delay of many minutes.

With these facts in view, it is the object of the present invention to provide a personnel inspection system in which a few individuals from a large crowd may be selected and examined without any delay in the movement of the crowd through the gateways and the like and, particularly, without the knowledge of any person in the crowd as to which persons are to be selected for examination.

Further objectives and advantages of the invention are made apparent in the following specification, wherein reference is made to the accompanying drawings in which the invention is illustrated.

In the drawings,

Fig. 1 is a plan view, illustrating diagrammatically the layout or arrangement of the present invention in conjunction with a series of exit gates.

Fig. 2 is an isometric view of the fluoroscopic detection apparatus, adapted to be used with the system of the present invention.

Fig. 3 is a plan view, illustrating diagammatically a modified arrangement of the system.

Fig. 4 is a similar view of a further modification, designed for space and low construction cost.

The drawings illustrate and the following description will be directed to the present invention employed in conjunction with exit gates of an industrial plant or area, but it is to be understood that this disclosure is merely illustrative of the manner in which the invention is used, and it will become apparent, as the description proceeds that various modifications and arrangements may be made in order to adapt the system to the different conditions which are met in different places.

Referring first to Fig. 1 of the drawings: A set of typical gateways is illustrated, the gateways or passages being shown at 10 as separated by small buildings or rooms 11 and railings 12. Ordinarily, the personnel leaving an industrial plant pass out through the several gateways 10 and, in most cases, the individuals stop opposite the rooms 11 to hand in a time card or state their name or number to an attendant or to have their lunch boxes inspected. It is the purpose of the present invention to select individuals from the lines as they approach the gateways so that selected individuals may be diverted from the line and subjected to inspection without delaying the outward passage of the main body of the crowd. To this end, there are provided directly in front of the gateways 10 a number of houses, or enclosures 13, which may, if convenient, be placed under a single roof and which are spaced to provide double passages separated by one of the railings 12 between each pair of houses. These passages, which are indicated by the reference numerals 14, lead toward the gateways, each passage serving two or more of the gateways, as indicated by the lines of arrows in the central part of Fig. 1, which illustrate the paths followed by the persons seeking exit through the gateways. Through this arrangement the number of lines of persons approaching the gateways is reduced without reducing the speed of their exit because of the fact that there is a slight delay at the gateways 10, but no delay as the line moves through the passages 14. In fact, this arrangement has been found to increase the speed of exit, due to the fact that it prevents congestion immediately in front of the gateways 10, and compels the crowd to approach the gateways in single, orderly files.

Each of the houses 13 includes an entrance 15, and an exit 16. The entrance 15 is hidden from the sight of the approaching persons by a wall or panel 17, and may also be provided with curtains or drapes 18, arranged in a manner to prevent persons in the passageways 14 from viewing the interior of the houses 13. Stationed adjacent to the passages 14 and, preferably, protected by a waist-high guardrail 19, are guards, whose positions are indicated by the symbol G.

As the lines pass through the passageways 14, the guard in each case may, by any suitable means of selection, such as the numbers or department classification on a worker's badge or by counting the individuals so that every twentieth person is selected, divert the selected individuals from the line and request them to exit through the house 13, following the paths indicated by the arrows in the central part of Fig. 1. The person so requested to pass through the house 13 may be subjected to a fluoroscopic examination and may then immediately pass out to the left through the exit 16 or, in case of the detection of some forbidden article, may be requested to step to the right for questioning or detention by a guard.

The fluoroscopic detection apparatus which may be used for this purpose, and which is described in detail in my co-pending application referred to hereinabove, consists generally as indicated in Fig. 2 of two cabinet-like units 20 and 21, separated by a vestibule 22. The unit 20 contains X-ray radiating apparatus and the unit 21 contains a fluorescent screen and an observer's station so that the form of a person standing in the vestibule is projected on the screen for observation. A small platform 23 and rostrum 24 are preferably positioned just opposite the exit from the vestibule, and provide a convenient station for a guard who may instruct the person in the manner of conducting himself while under observation, and who may also assist in detaining a suspected individual.

In Fig. 1 the position of the detecting apparatus within the house 13 is shown to be such that the person entering steps immediately into the vestibule and upon instruction from the guard behind the rostrum 24, may step to the left through the passage 16, or may step to the right for further questioning or examination.

Fig. 1 illustrates each of the houses 13 as containing the detection apparatus. Satisfactory results may also be obtained with a single detecting apparatus and several dummies or cabinets constructed to present an identical appearance. In fact, with the panel 17 and curtains 18 concealing the interior of the house 14 from view, even the dummies may be eliminated and a single apparatus may be used in any one of the houses 13, without knowledge of the individuals passing the house as to where it is situated. In order that the detecting apparatus may be conveniently moved, the houses are provided with side doors 25, which open outwardly so that the entire apparatus may be moved from one house to another as desired. With this arrangement the apparatus may be transferred from house to house without moving it out of the inspection area, and with a minimum of disturbance to its more fragile parts, such as the X-ray tubes and glass covered fluorescent screen. For this purpose, a section 26 of the railing between the houses may be removable and as the platform 23 and rostrum 24 are slightly narrower than the vestibule 22, they may be placed in the vestibule to reduce the width of the apparatus as it is being moved from one house to the next.

Because the device is so movable, it is impossible for anyone approaching the house 13 on his way toward the exit gateways to know which house contains the detection apparatus, and even though relatively few persons are actually examined, there remains the possibility that any person leaving the plant may be subjected to examination, which fact acts as a deterrent to all who might attempt to carry tools, materials or other articles of value on their person.

Fig. 3 of the drawings shows an arrangement designed for installation wherein the exit gateways not shown in this figure are confined in a narrow space. In this figure, the house 13 is elongated in shape and the detection apparatus is arranged along one side wall rather than across the front wall. The persons entering step into the vestibule following the path indicated by the arrows, then turn and step out of the vestibule toward the exit door. A swinging door is indicated at 27 and may, if desired, be used over the exit. The entrance illustrated at 28 consists of two doors—one normally open, and the other normally closed—but capable of being opened in order to permit the detection apparatus to be removed. A removable panel or screen 29 may be used within the house 13 to conceal the apparatus from view from the exterior of the house, thus obviating the necessity of the panel 17, shown in Fig. 1.

Fig. 4 illustrates a further modification adapted to minimize the space occupied by the house 13 and also designed for a minimum cost of construction. In this instance, the house 13 is three-sided and closed at its forward end by the cabinet which contains the detection apparatus. With the arrangement shown in Fig. 4 a dummy cabinet must be used at all stations where the actual detecting apparatus is not in place, and it is desirable but not necessary to employ a panel 30, which serves to shield the forward portion of the cabinet from general view.

Each of the modifications illustrated in Figs. 3 and 4 are designed for use in conjunction with the gateways as illustrated in Fig. 1, though it should be understood that the gateways 10 themselves are not essential to the invention as, unless their presence is necessary in checking the employees out of the plant, they may be entirely eliminated, as the houses 13 and intermediate railings 12, will serve to provide the gateway by means of which the personnel leaves the plant. Furthermore, each of the houses 13 may be used with a single exit gate where it is more convenient due to existing conditions to do so.

In the foregoing description, the gates have been described as exit gates. They may, of course, be used as entrance gates by reversal of the arrangement shown. It is also possible where the personnel leaving a plant is inspected to conduct a periodic inspection of persons entering the plant with the same arrangement as herein illustrated. The arrows at the right hand side of Fig. 1 illustrate the path taken by persons subject to inspection upon entering one pair of gates. As an alternate method of inspecting persons entering the plant, an extra door similar to that shown at 16 may be provided in the back of the house 13. With two such doors, persons entering the plant by any one of the gates which communicate with the house could pass through the house from back to front and undergo inspection on the way.

Having thus described my invention, what I claim and desire to secure by Letters Patent is:

A personnel inspection system comprising means for confining a crowd of people to substantially parallel single files, a row of enclosures arranged transversely to and separating said files, a laterally extending passageway provided at each enclosure whereby selected individuals from the files may pass through said enclosures, a personnel inspection apparatus in at least one of the enclosures, and normally closed substantially aligned openings in the enclosures through which said apparatus may be moved to any other enclosure.

HENRY SICULAR.